United States Patent Office 3,323,893
Patented June 6, 1967

---

3,323,893
PYRIDAZONE DERIVATIVES AND HERBICIDAL COMPOSITIONS CONTAINING THEM
Franz Reicheneder, Ludwigshafen (Rhine), Germany, and Karl Dury, deceased, late of Kirchheimbolanden, Germany, by Johanna Maria Dury, heiress-at-law, Kirchheimbolanden, Germany, and Adolph Fischer, Mutterstadt, Pfalz, Germany, assignors to Badische Anilin- & Soda-Fabrik Aktiengesellschaft, Ludwigshafen (Rhine), Germany
No Drawing. Filed Apr. 26, 1966, Ser. No. 545,512
Claims priority, application Germany, May 7, 1965, B 81,810
6 Claims. (Cl. 71—2.5)

The present invention relates to new pyridazone derivatives. It relates particularly to bromine-containing pyridazonamides and pyridazonimides of dicarboxylic acids. The invention also relates to a method of controlling unwanted vegetation with these new pyridazone derivatives.

It is an object of the invention to provide valuable new pyridazone derivatives. Another object of the invention is to provide amides and imides of dicarboxylic acids and bromoaminopyridazone. A further object of the invention is to provide a method for controlling unwanted plant growth, particularly in crop plants without damage to the crop plants.

It is known that 1-phenyl-4-amino-5-chloropyridazone-(6)- and 2-chloro-4,6-bis-(ethylamino)-s-triazine have a selective and total herbicidal action. This action is, however, unsatisfactory.

We have found that pyridazone derivatives having the formula:

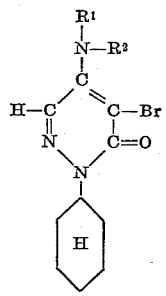

in which $R^1$ denotes the radical —CO—COOH,

—CO—CH=CH—COOH or —CO—CH$_2$—CH$_2$—COOH or the salts of these radicals, $R^2$ denotes hydrogen, or $R^1$ and $R^2$ together denote the radical —CO—CH=CH—CO— or

—CO—CH$_2$—CH$_2$—CO— have a good herbicidal action. They are suitable both for selective and total control of plant growth.

By salts we understand generally salts with alkalies or alkaline earths or ammonia or amines, for example sodium, potassium, magnesium, calcium, ammonia, ethanolamine or diethanolamine.

The reaction products with dicarboxylic acids may be prepared by methods analogous to known methods. For example aminopyridazone and the dicarboxylic acid may be condensed by fusing the two components, by removing water by means of a suitable solvent, for example xylene, if desired with a condensing agent, for example zinc chloride, or by heating in a solvent, for example glacial acetic acid.

The reaction of 1-cyclohexyl-4-amino-5-bromopyridazone-(6) with an excess of oxalyl chloride followed by hydrolysis gives the semioxamide of 1-cyclohexyl-4-amino-5-bromopyridazone-(6). This compound may be converted into the corresponding salts with alkalies.

The following are examples of active ingredients:

(I) N-[4-(1-cyclohexyl-5-bromopyridazone-6)-yl]-oxamic acid (melting point 202° C. with decomposition);
(II) N-[4-(1-cyclohexyl-5-bromopyridazone-6)-yl]-maleamic acid (melting point 232° to 233° C.);
(III) N-[4-(1-cyclohexyl-5-bromopyridazone-6)yl]-succinimide (melting point 151° to 153° C.).

The agents for controlling plant growth in accordance with this invention may be used as solutions, emulsions, suspensions or dusting powders. The form in which they are used will depend entirely on the purpose for which they are being used and in every case they should ensure a fine distribution of the active ingredient in use. Particularly when using them as total herbicides, the effect may be enhanced by the use of carriers which themselves are phytotoxic, such as high boiling mineral oil fractions or chlorohydrocarbons.

Selectivity of growth inhibition on the other hand is more marked in some cases with the use of carriers which are inert to the plants.

Aqueous forms of application may be prepared from emulsion concentrates, pastes or wettable powders (spray powders) by adding water. To prepare emulsions, the substances (as such or dissolved in one of the abovementioned solvents) may be homogenized in water by means of mixing or dispersing agents. Emulsifying agents and dispersing agents which may be used include both cationactive emulsifying agents, such as quaternary ammonium compounds, and anionactive emulsifying agents, such as soaps, soft soaps, aliphatic long chain sulfuric acid monoesters, as well as aliphaticaromatic sulfonic acids, ligninsulfonic acids, long chain alkoxyacetic acids, and also nonionic emulsifying agents, as for example polyethylene ethers of fatty alcohols and polyethylene oxide condensation products. The salts may be used in aqueous solution.

The spectrum of biological activity may be broadened by adding substances having bactericidal, fungicidal or plant growth regulating properties and also by combination with fertilizers.

The invention is illustrated by the following examples.

Example 1

Loamy sandy soil is placed in plastic pots having a diameter of 8 cm. in a greenhouse and the following seeds are sown in the soil: Indian corn (*Zea mays*), beet (*Beta vulgaris*), barley (*Hordeum vulgare*), wheat (*Triticum vulgare*), onions (*Allium cepa*), annual meadow grass (*Poa annua*), slender foxtail (*Alopecurus myosuroides*), wild mustard (*Sinapis arvensis*), white goosefoot (*Chenopodium album*), chickweed (*Stellaria media*) and sorrel (*Rumex sp.*). On the same day, the test pots are sprayed with active ingredients (I) and, for comparison, with 1-phenyl-4-amino-5-chloropyridazone-(6) (A) in an amount equivalent to 2 kg. of each active substance per hectare. The active ingredients are dissolved or suspended (with sodium ligninsulfonate) in an amount of water equivalent to 600 liters per hectare. Three weeks later it is observed that active ingredient I has a generally stronger herbicidal action on the weeds and weed grasses than active ingredient A. The results may be seen from the following Table 1:

TABLE 1

| | Active ingredient | |
|---|---|---|
| | I | A |
| Crops plants: | | |
| Indian corn | 0 to 10 | 10. |
| Beet | 0 | 0. |
| Barley | 10 | 20 to 30. |
| Wheat | 10 | 30. |
| Onions | 0 | 10. |
| Unwanted plants: | | |
| Annual meadow grass | 90 to 100 | 70. |
| Slender foxtail | 80 to 90 | 40 to 50. |
| Wild mustard | 100 | 70. |
| White goosefoot | 90 to 100 | 70 to 80. |
| Chickweed | 100 | 70. |
| Sorrel | 80 | 60. |

0=no damage; 100=total destruction.

The same biological activity as I is exhibited by: (IV) N-[4-(1-cyclohexyl-5-bromopyridazone - 6) - yl]-maleimide, the active ingredient (II), the potassium salt thereof and the sodium salt of active ingredient (I).

*Example 2*

The plants: Indian corn (*Zea mays*), beet (*Beta vulgaris*), barley (*Hordeum vulgare*), wheat (*Triticum vulgare*), onions (*Allium cepa*), annual meadow grass (*Poa annua*), slender foxtail (*Alopecurus myosuroides*), wild mustard (*Sinapis arvensis*), white goosefoot (*Chenopodium album*), chickweed (*Stellaria media*), and sorrel (*Rumex sp.*) are sprayed at a growth height of 4 to 12 cm. with active ingredient (I) and, for comparison, with active ingredient (A) in an amount equivalent to 2 kg. of each active ingredient per hectare. The active ingredients are dissolved or suspended (with sodium ligninsulfonate) in an amount of water equivalent to 600 liters per hectare. Eight days later it is observed that active ingredient I has a considerably better action on the weeds and weed grasses than active ingredient A. The results may be seen from the following Table 2:

TABLE 2

| | Active ingredient | |
|---|---|---|
| | I | A |
| Crop plants: | | |
| Indian corn | 0 to 10 | 10. |
| Beet | 0 | 0. |
| Barley | 10 | 20 to 30. |
| Wheat | 10 | 30. |
| Onions | 10 | 30. |
| Unwanted plants: | | |
| Annual meadow grass | 90 to 100 | 40 to 50. |
| Slender foxtail | 90 | 40 to 50. |
| Wild mustard | 100 | 80. |
| White goosefoot | 100 | 80. |
| Chickweed | 100 | 70 to 80. |
| Sorrel | 80 | 50 to 60. |

0=no damage; 100=total destruction.

A similar biological activity to I is exhibited by active ingredients III and IV and the ammonium salt of I.

*Example 3*

An agricultural cultivated area which has been sown with wild mustard (*Sinapis arvensis*), white goosefoot (*Chenopodium album*), small nettle (*Urtica urens*), gallant soldier (*Galinsoga paraviflora*), chickweed (*Stellaria media*), sorrel (*Rumex sp.*), amaranth pigweed (*Amaranthus retroflexus*), annual meadow grass (*Poa annua*), slender foxtail (*Alopecurus myosuroides*) and perennial ryegrass (*Lolium perenne*) is sprayed with active ingredient (I) and, for comparison, with 2-chloro-4,6-bis-(ethylamino)-s-triazine (B) in an amount equivalent to 3 kg. of each active ingredient per hectare. The active ingredients are dissolved or suspended (with sodium ligninsulfonate) in an amount of water equivalent to 600 liters per hectare. After the weeds and weed grasses have emerged, it is evident that there has been a must stronger action on the test area treated with active ingredient I than with active ingredient B. Three to four weeks later, almost all the plants have been completely destroyed.

The active ingredients III and IV have the same biological activity as I.

*Example 4*

A test area which is overgrown with wild mustard (*Sinapis arvensis*), white goosefoot (*Chenopodium album*), small nettle (*Urtica urens*), gallant soldier (*Galinsoga parviflora*), vetch (*Vicia sp.*), amaranth pigweed (*Amaranthus retroflexus*), chickweed (*Stellaria media*), sorrel (*Rumex sp.*), annual meadow grass (*Poa annua*), slender foxtail (*Alopecurus myosuroides*) and perennial ryegrass (*Lolium perenne*) is sprayed with active ingredient (I) and, for comparison, with active ingredient (B) in an amount equivalent in each case to 3 kg. per hectare of active ingredient. The active ingredients are dissolved or suspended (with sodium ligninsulfonate) in an amount of water equivalent to 500 liters per hectare. The weeds and weed grasses have a growth height of 4 to 9 cm. at the time of treatment. Eight days later the plants treated with active ingredient I exhibit marked damage while the weeds treated with active ingredient B exhibit normal growth. Almost all the plants have been completely destroyed after three to four weeks. Active ingredient IV has the same biological action as I.

We claim:

1. A pyridazone derivative having the formula:

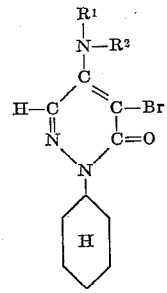

in which $R^1$ denotes a member selected from the group consisting of the radicals —CO—COOH,

—CO—CH=CH—COOH and —CO—CH$_2$—CH$_2$—COOH and the salts of these radicals and $R^2$ denotes hydrogen and $R^1$ and $R^2$ together denote one of the radicals

—CO—CH=CH—CO— and —CO—CH$_2$—CH$_2$—CO—.

2. N-[4-(1-cyclohexyl-5-bromopyridazone - 6) - yl]-oxamic acid.

3. N-[4-(1-cyclohexyl-5-bromopyridazone - 6) - yl]-maleamic acid.

4. N-[4-(1-cyclohexyl-5-bromopyridazone - 6) - yl]-succinimide.

5. N-[4-(1-cyclohexyl-5-bromopyridazone - 6) - yl]-maleimide.

6. A process for controlling unwanted plant growth in which the plants or the soil are treated with a phytotoxic amount of a pyridazone derivative as claimed in claim 1.

No references cited.

NICHOLAS S. RIZZO, *Primary Examiner.*